3,361,705
MASTERBATCH COMPOSITIONS
James W. Kay, Riegelsville, Pa., and Paul Tabolinsky, Hawthorne, N.J., assignors to Chas. Pfizer & Co., Inc., New York, N.Y., a corporation of Delaware
No Drawing. Filed Aug. 3, 1965, Ser. No. 477,031
13 Claims. (Cl. 260—37)

This invention relates to a process for coloring synthetic materials. More particularly, it relates to solid-state masterbatch compositions which are useful for coloring polymeric materials and to their methods of preparation.

As is well known, solid state masterbatch pigments have been effectively used as a means of introduction of color into plastics and other polymeric media. Generally, a solid state masterbatch is composed of the pigment dispersed or uniformly distributed throughout a plastic or polymeric material at a pigment concentration higher than is desired in the finished product to be colored by the masterbatch. Other materials may also be present in the masterbatch, for example, dispersing aids, polymerization promoters or inhibitors, U.V. light absorbers, etc. The concentrated masterbatch is added to colored or uncolored plastic or polymeric material at a level which will result in the desired shade in the finished product. The masterbatch, therefore, must be able to be readily distributed, uniformly, throughout the plastic media in order to be of value. If a solid state masterbatch is used to color a plastic or polymeric liquid or solution, the polymeric moiety of the masterbatch must dissolve readily into the mass to be colored, thus releasing the pigment to be uniformly distributed throughout the mass. If the solid state masterbatch is to color dry plastic or polymeric materials, it must melt or otherwise lend itself to easy distribution uniformly through the material to be colored. An example of this would be the addition of a colored vinyl solid state masterbatch to a clear solid state vinyl which is then extruded wherein the masterbatch melts during extrusion and uniformly colors the mass.

The most common method for preparing solid state masterbatched pigments is to combine the pigment and polymeric material together, dispersing the pigment in the polymer by internal mixing, such as in a Banbury or a two-roll mill, or extruding through an extruder. Most of these types of processing require both high temperatures and substantial mechanical energy. Another method consists of dissolving or suspending the polymeric material in a suitable solvent, adding thereto a pigment, using a pebble mill, roller mill or other conventional equipment to effect dispersion of the pigment. Subsequently, solvent is evaporated from the colored masterbatch and a solid-state product results.

It has now been found that solid-state masterbatches can be manufactured in a manner which does not require the aforesaid high energy input in order to wet out and disperse the pigment in the polymeric media. Further, it allows the consumer to color his polymeric material by simple mixing instead of using costly and tedius conventional dispersion equipment.

Accordingly, this invention discloses a process for the preparation of solid-state masterbatch compositions consisting of synthetic polymeric materials in admixture with a pigment colorant which comprises: dispersing a pigment colorant in a polar solvent selected from the group consisting of dialkyl sulfoxide, N-alkyl formamide, N-alkyl acetamide, N,N-dialkyl formamide and N,N-dialkyl acetamide, said alkyl group containing from 1 to 10 carbon atoms; dissolving therein a polymeric material, and commingling the resulting dispersion and a liquid which is miscible with the said polar solvent and a non-solvent for the polymer-pigment composition, and recovering the solid-state masterbatch composition which precipitates.

A modification of the above-described process, which is an embodiment of this invention, consists of dissolving said polymeric material in a suitable solvent prior to dissolving in said pigment colorant dispersion. A suitable solvent is one which must be miscible with both the said polar solvent and with the said precipitating liquid. For instance, if the polar solvent is dimethyl sulfoxide, and the precipitating liquid is water, a suitable solvent would be acetone, methanol, dimethyl formamide, dimethyl acetamide and, of course, dimethyl sulfoxide.

Illustrative of the polymeric materials which may be colored in accordance with the process of the present invention are Dacron, nylon, polyacrylonitrile and copolymers thereof, butadiene-acrylonitrile, polyvinyl chloride, and its copolymers, the reaction product of epichlorohydrin and bis-phenol A, the reaction product of a polyisocyanate and a polyester, cellulose acetate, polyesters, alkyd resins and others.

Once the polymer, either in solution or in its natural state, is combined with the dispersed pigment solution, the next step of the herein disclosed process may be carried out. Said subsequent step comprises combining said pigment-polymer solution with a solvent which causes precipitation of the pigment-polymer composition. Generally, water is the solvent of choice; however, it is possible to use any suitable solvent provided that the solvent utilized is immiscible with the solid pigment-polymer composition and is miscible with the solvent or solvents originating from the pigment-polymer dispersion. For example, in lieu of water, an alcoholic solvent such as methanol or ethanol or aqueous mixtures thereof may be used. Once the pigment-polymer dispersion comes in contact with the precipitating solvent, the pigment and polymer instantly precipitate. The solvent from the pigment-polymer solution diffuses out of the precipitate into the precipitating solvent creating an immiscible one-phase solvent system and a solid precipitate.

The pigment-polymer precipitate (masterbatch) can now be removed from the liquid by any convenient physical manipulation, such as filtration, decantation etc. It is then air-dried, or dried with heat, to remove the last traces of liquid clinging to the surface. The liquid phase containing the active solvent may then be processed for recovery and re-use.

Particular importance is derived from the aforesaid process when polyacrylonitrile is utilized as said polymeric material. Up to now, it has been quite difficult to prepare a polyacrylonitrile-pigment masterbatch containing a sizable amount of pigment colorant. By means of the herein disclosed process, a masterbatch composition containing polyacrylonitrile or a copolymer thereof in admixture with a pigment colorant can be prepared wherein said composition may contain as much as 80% by weight of pigment. It is obvious that a masterbatch composition to be used for coloring purposes is most preferred wherein the pigment comprises a major amount of the total composition. The greater the pigment concentration in the masterbatch, the smaller the amount by weight of said masterbatch will be required to sufficiently color a chosen amount of uncolored plastic. Even more significantly, the masterbatch compositions described herein possess the following advantages:

(1) Ease of solubilization
(2) Uniform particle size and distribution of pigment
(3) Higher coloring value
(4) Provides a higher degree of transparency within the finished product
(5) Reduces tendency for the pigment to reagglomerate Up to now, the prior art has not disclosed any method which is comparable with regard to practicability and inexpensiveness. Even more striking is the ability of the present process to provide masterbatch composition in which the pigment colorant comprises as high as 80% by weight of the total composition.

The present invention, in addition to a process for preparing solid-state masterbatch compositions, is concerned with the preliminary preparation of pigment-containing dispersions, said preparation being a necessary step in the overall reaction sequence. The term "dispersion," as used throughout, encompasses solutions as well as suspensions. Although the overall process described herein can be carried out successfully using either a pigment solution or suspension, it is preferred, for reasons to follow, to utilize a pigment solution. In any event, it is mandatory regardless of the type of pigment dispersion, that the polymeric material to be combined must effectively dissolve in the pigment-containing dispersion whether it be a suspension or solution.

Pigments are essentially insoluble in common solvents and in water. Their coloring properties derive from their ability to reflect light, refract light, diffract light as well as to transmit light. Pigments, when used as coloring matter generally have finite physical shape and measurable particle surface areas. The introduction of pigments into plastics, polymers and coating materials generally involves a considerable amount of energy input into the system. For example, in the manufacture of the dry pigment, in order to grind agglomerates of the pigment to the finest particle size, high energy milling is required. When the pigment is combined with, or dispersed in the plastic, milling such as ball mill, roller mill, sand mill, etc. is again required. Many times these pigments later flocculate or reagglomerate in the polymeric media due to the extreme amount of energy to which they have been subjected. Hence, the introduction of pigment into the polymeric media in the form of a solution of the pigment would eliminate the need for most or all of the high energy milling work normally done on the pigment and pigment-polymer system.

The process disclosed herein for the preparation of actual pigment solutions, i.e. where the dispersing step is a solubilization step comprises dissolving a pigment in a polar solvent selected from the group consisting of dialkyl sulfoxide, N-alkyl formamide, N-alkyl acetamide, N,N-dialkyl formamide and N,N-dialkyl acetamide, said alkyl group containing from 1 to 10 carbon atoms wherein said solubilization is effected by the addition of a solubilizing agent. The term solubilizing agent, for purposes of this disclosure, refers to any acid or base, inorganic as well as organic. Naturally, while any acid or base may be used, it should be pointed out that different ones in different proportions give optimum conditions for maximum solubility of a certain pigment. For example, whereas all organic amines may be suitable, it is found that monoethanolamine is most effective with regard to monoazo pigments. Examples of appropriate organic amines include monoethanolamine and ethylene diamine. Suitable inorganic bases are ammonium hydroxide, potassium hydroxide, and sodium hydroxide.

Regarding suitable acids, it is found that mineral acids in general, for instance, HCl and $H_2SO_4$, work best; however, organic acids may also be utilized.

Whether one uses an acid solubilizing agent or a basic solubilizing agent depends on the pigment to be solubilized. In general, it is found that the following group of pigment colorants are solubilized by the addition of a basic agent: monoazo, azonaphthol, pyrazolone, heterocyclic, anthraquinone, thioindigoid and phthalocyanine pigments. On the other hand, those pigments which are solubilized by the addition of an acidic solubilizing agent include metalized azo pigments. Evidence of the solubilizing of these pigments is quite apparent. Azo yellows, for example, when slurried or dispersed in dimethyl sulfoxide maintain their brilliant yellow shades and the mixture is opaque. Upon addition of the amine, the mixture turns to a deep amber-red color and becomes transparent. Dissolved, non-metallized reds go either deeper red, or violet or blue or shift to much lighter orange shades. Phthalo greens tend to be bluer in cast and more brilliant. Anthraquinone and heterocyclic colors show erratic, but generally great color shifts.

The method followed for preparing such pigment solutions is as follows: A large excess of pigment is slurried in a polar solvent, for example, dimethyl sulfoxide. The suitable solubilizing agent, acid or base, is added until no more pigment dissolves. The excess unreacted pigment is removed leaving a clear filtrate having pigment incorporated therein. Once the parameters for each specific solution are known, complete solution may be attained by combining the appropriate amounts of components simultaneously.

Concerning the polar solvent to be used, it is found that strong polar solvents such as dimethyl sulfoxide, dimethyl acetamide, and dimethyl formamide are most preferred; however, it is possible to use any polar solvent which can successfully dissolve the polymeric substance and in addition be completely miscible with the precipitating solvent which is generally water.

By means of the aforesaid method, clear pigment-containing solutions in which said pigment comprises up to about 20% by weight of the total composition can be easily prepared.

The preparation of these pigment-containing solutions may be then processed in accordance with the overall process in preparing solid masterbatch compositions containing a substantial amount of pigment colorant incorporated therein.

It is also within the scope of this invention to utilize a pigment suspension in carrying out the overall reaction sequence. While it is more desirable, however, to use a solution, a suspension will also provide satisfactory results. In general, the masterbatch compositions so obtained, using pigment suspensions, will provide a lower coloring value and exhibit a greater tendency to reagglomerate.

The following examples are given by way of illustration and not to be construed as limitations of this invention, many variations of which are possible without departing from the spirit or scope thereof.

*Example I*

To a beaker containing 100 ml. of dimethyl sulfoxide is added a large excess of monoazo yellow Hansa 10–G pigment. While the resulting slurry is stirred, monoethanolamine is added until optimum solvency of pigment is observed whereupon any undissolved pigment is removed. The resulting product (filtrate) comprises 3.0% solubilized pigment and 97% solvent composed of 81.5% dimethyl sulfoxide and 18.5% monoethanolamine. The resulting pigment solution is combined with a dimethyl sulfoxide solution containing an equivalent amount by weight of polyacrylonitrile.

The 50–50 mixture of pigment-polymer is then added to a large excess of water with stirring. As the steady stream strikes the water, pigment and polymer are instantly co-precipitated forming a continuous colored plastic strand or fiber in the water. The solvents from the pigment-polymer solution are miscible with the water and diffuse into it, leaving the colored plastic strand. Since base is used as solubilizing agent, sufficient acid is added for complete neutralization. After all of the pigment polymer solution is stranded, it is removed from the water-solvent mixture and washed with fresh water to remove last traces of solvent and dissolved salts. It is then rinsed with methanol to facilitate low temperature drying of surface moisture, then dried at 50° C.–70° C. in an oven. The resulting masterbatch is composed of 50% pigment colorant and 50% polymeric material. The masterbatch composition is then incorporated into a large mass of colorless polyacrylonitrile resulting in a uniformly yellow colored polyacrylonitrile plastic formulation.

*Example II*

The procedure of Example I is repeated except said polyacrylonitrile is not pre-dissolved in dimethyl sulfoxide prior to combining with said pigment solution.

*Example III*

The procedure of Example I is repeated except dimethyl acetamide is used in lieu of dimethyl sulfoxide with comparable results.

*Example IV*

The procedure of Example I is repeated except dimethyl formamide is used in lieu of dimethyl sulfoxide with comparable results.

*Example V*

The procedure of Example I is repeated except an azo-naphthol red, para red is substituted for monoazo yellow Hansa 10-G with comparable results. The intermediate pigment solution consists of 7.0% pigment and 93% solvent composed of 74.3% dimethyl sulfoxide and 25.7% monoethanolamine.

*Example VI*

The procedure of Example I is repeated wherein an azo-naphthol red, chlorinated para red, is substituted for monoazo yellow Hansa 10-G pigment with comparable results. The intermediate pigment solution consists of 3.7% pigment and 96.3% solvent composed of 86.0% dimethyl sulfoxide and 14.0% monoethanolamine.

*Example VII*

The procedure of Example I is repeated wherein a monoazo red, lithol rubine, is used in lieu of monoazo yellow Hansa 10-G with comparable results. The intermediate pigment solution consists of 4.4% pigment and 95.6% solvent composed of 84.6% dimethyl sulfoxide and 15.4% monoethanolamine.

*Example VIII*

The procedure of Example I is repeated wherein an azo-naphthol B.O.N. maroon is used in lieu of monoazo yellow Hansa 10-G with comparable results. The intermediate pigment solution consists of 15.9% pigment and 84.1% solvent composed of 99.0% dimethyl sulfoxide and 1.0% monoethanolamine.

*Example IX*

The procedure of Example I is repeated substituting disazo yellow benzidine OT pigment for monoazo yellow Hansa 10-G and alcoholic KOH in place of monoethanolamine with comparable results. The intermediate pigment solution consists of 7.4% pigment and 92.6% solvent composed of 97.5% dimethyl sulfoxide and 2.5% KOH.

*Example X*

The procedure of Example I is repeated substituting a heterocyclic, quinacridone red pigment for monoazo yellow Hansa 10-G and alcoholic KOH in place of monoethanolamine with comparable results. The intermediate pigment solution consists of 8.0% pigment and 92% solvent composed of 95.0% dimethyl sulfoxide and 5.0% potassium hydroxide.

*Example XI*

The procedure of Example I is repeated substituting a monoazo red pigment for monoazo yellow Hansa 10-G and ethylenediamine in place of monoethanolamine with comparable results. The intermediate pigment solution consists of 8.1% pigment and 91.9% solvent composed of 84.6% dimethyl sulfoxide and 15.4% ethylenediamine.

*Example XII*

The procedure of Example I is repeated substituting a phthalocyanine green for monoazo yellow Hansa 10-G and ethylenediamine in place of monoethanolamine with comparable results. The intermediate pigment solution consists of 4.5% pigment and 95.5% solvent composed of 69.0% dimethyl sulfoxide and 31.0% ethylenediamine.

*Example XIII*

The procedure of Example I is repeated substituting a metalized 2-B red pigment for monoazo yellow Hansa 10-G and sulfuric acid in place of monoethanolamine. The intermediate pigment solution consists of 11.75% pigment and 88.25% solvent composed of 97.5% dimethylsulfoxide and 2.5% sulfuric acid. Since acid is used as solubilizing agent, sufficient base is added for complete neutralization.

*Example XIV*

The procedure of Examples V through VIII are repeated wherein dimethyl acetamide and dimethyl formamide respectively are used in place of dimethyl sulfoxide and substantially the same results are obtained.

*Example XV*

The procedure of Example I is repeated wherein the solvents enumerated below are used in lieu of dimethyl sulfoxide with comparable results:

| | |
|---|---|
| methyl formamide | methyl-butyl sulfoxide |
| dibutyl formamide | methyl-decyl sulfoxide |
| methyl acetamide | dioctyl formamide |
| dibutyl acetamide | monyl formamide |
| dibutyl sulfoxide | dihexyl acetamide |
| | decyl acetamide |

*Example XVI*

The procedures of Examples I through XV are repeated except no solubilizing agent is used. The absence of solubilizing agent results ni a pigment suspension. The amount of pigment used in the corresponding suspension is that maximum amount which would have been solubilized by the addition of acid or base under the conditions utilized. The resulting pigment dispersion is combined with an equivalent amount by weight of polyacrylontrile to provide a 50—50 pigment-polymer mixture which is processed to the ultimate masterbatch by the procedure of Example I. The masterbatch composition is then incorporated into a larger mass of colorless polyacrylontrile which results in a uniformly colored polyacrylontrile plastic formulation.

*Example XVII*

The procedure of Example I is repeated except cellulose acetate is used in place of polyacrylonitrile with comparable results. The masterbatch composition is then incorporated into a larger mass of colorless cellulose acetate resulting in a uniformly colored cellulose acetate plastic formulation.

*Example XVIII*

The procedure of Example I is repeated wherein cellulose acetate is used in lieu of polyacrylonitrile and the solvent used to dissolve said polymer is acetone instead of dimethyl sulfoxide. Similar results are obtained. The masterbatch composition is then incorporated into a larger mass of colorless cellulose acetate resulting in a uniformly colored cellulose acetate plastic formulation.

*Example XIX*

The procedure of Example I is repeated wherein the appropriate weight ratios of pigment to polymer are used in order to prepare corresponding pigment-polymer masterbatch compositions having the following weight ratios:

Pigment/polymer, weight-ratio:
  20/80
  40/60
  60/40
  80/20

Example XX

The procedure of Examples I through XV are repeated wherein the following polymeric materials are used in place of polyacrylonitrile with comparable results:

Dacron
nylon
butadiene-acrylonitrile copolymer
polyvinyl chloride

What is claimed is:

1. A process for the preparation of solid-state masterbatch compositions for the coloring of synthetic polymeric materials which comprises first dissolving a pigment colorant selected from the group consisting of monoazo, diazo, azonaphthol, pyrazolone, quinacridone, anthraquinone, thioindigoid and phthalocyanine pigments in a polar solvent selected from the group consisting of dialkyl sulfoxide, N-alkyl formamide, N-alkyl acetamide, N,N-dialkyl formamide and N,N-dialkyl acetamide, said alkyl group containing from 1 to 10 carbon atoms, by the addition of a small amount of a base solubilizing agent selected from the group consisting of monoethanolamine, ethylene diamine, ammonium hydroxide, potassium hydroxide and sodium hydroxide, then dissolving therein a synthetic polymeric material which is soluble in the said polar solvent, commingling the resulting solution with a precipitating liquid which is miscible with the said polar solvent and is a non-solvent for the polymer-pigment composition and is selected from the group consisting of water, methanol, ethanol and mixtures thereof, and recovering the solid-state masterbatch composition which precipitates.

2. A process for the preparation of solid-state masterbatch compositions for the coloring of synthetic polymeric materials which comprises first dissolving a metalized azo pigment in a polar solvent selected from the group consisting of dialkyl sulfoxide, N-alkyl formamide, N-alkyl acetamide, N,N-dialkyl formamide and N,N-dialkyl acetamide, said alkyl group containing from 1 to 10 carbon atoms, by the addition of a small amount of a mineral acid, then dissolving therein a synthetic polymeric material which is soluble in the said polar solvent, commingling the resulting solution with a precipitating liquid which is miscible with the said polar solvent and is a non-solvent for the polymer-pigment composition and is selected from the group consisting of water, methanol, ethanol and mixtures thereof, and recovering the solid-state masterbatch composition which precipitates.

3. A process as in claim 1 wherein said polymeric material is dissolved in a solvent prior to dissolving in said pigment colorant solution, said solvent being miscible with the said polar solvent and with the said precipitating liquid.

4. A process as in claim 1 wherein said pigment is monoazo yellow Hansa 10–G, said solvent is dimethyl sulfoxide, and said solubilizing agent is monoethanolamine.

5. A process as in claim 1 wherein said pigment is disazo yellow benzidine OT, said solvent is dimethylsulfoxide and said solubilizing agent is potassium hydroxide.

6. A process as in claim 1 wherein said pigment is Quinacridone Red B, said solvent is dimethyl sulfoxide and said solubilizing agent is potassium hydroxide.

7. A process as in claim 1 wherein said pigment is para azo-naphthol red, said solvent is dimethyl sulfoxide and said solubilizing agent is monoethanolamine.

8. A process as in claim 1 wherein said pigment is monoazo red, said solvent is dimthyl sulfoxide and said solubilizing agent is ethylene diamine.

9. A process as in claim 1 wherein said pigment is chlorinated azonaphthol para red, said solvent is dimethyl sulfoxide and said solubilizing agent is monoethanolamine.

10. A process as in claim 1 wherein said pigment is monoazo red lithol rubine, said solvent is dimethyl sulfoxide and said solubilizing agent is monoethanolamine.

11. A process as in claim 1 wherein said pigment is azonaphthol B.O.N. maroon, said solvent is dimethyl sulfoxide and said solubilizing agent is monoethanolamine.

12. A process as in claim 1 wherein said pigment is phthalocyanine green, said solvent is dimethyl sulfoxide and said solubilizing agent is ethylene diamine.

13. A process as in claim 2 wherein said pigment is metalized 2-B red, said solvent is dimethylsulfoxide and said solubilizing agent is sulfuric acid.

References Cited

UNITED STATES PATENTS

| | | | |
|---|---|---|---|
| 2,006,720 | 7/1935 | Rogers | 106—308 |
| 2,701,211 | 2/1955 | Taylor | 260—37 |
| 2,868,663 | 1/1959 | Jarmus | 260—37 |
| 2,957,745 | 10/1960 | Braun | 260—30.8 |
| 3,215,663 | 11/1965 | Weisberg | 260—30.8 |

FOREIGN PATENTS 729,584   5/1955   Great Britain.

JULIUS FROME, *Primary Examiner.*